*INVENTOR.*
RICHARD D. RIVERS

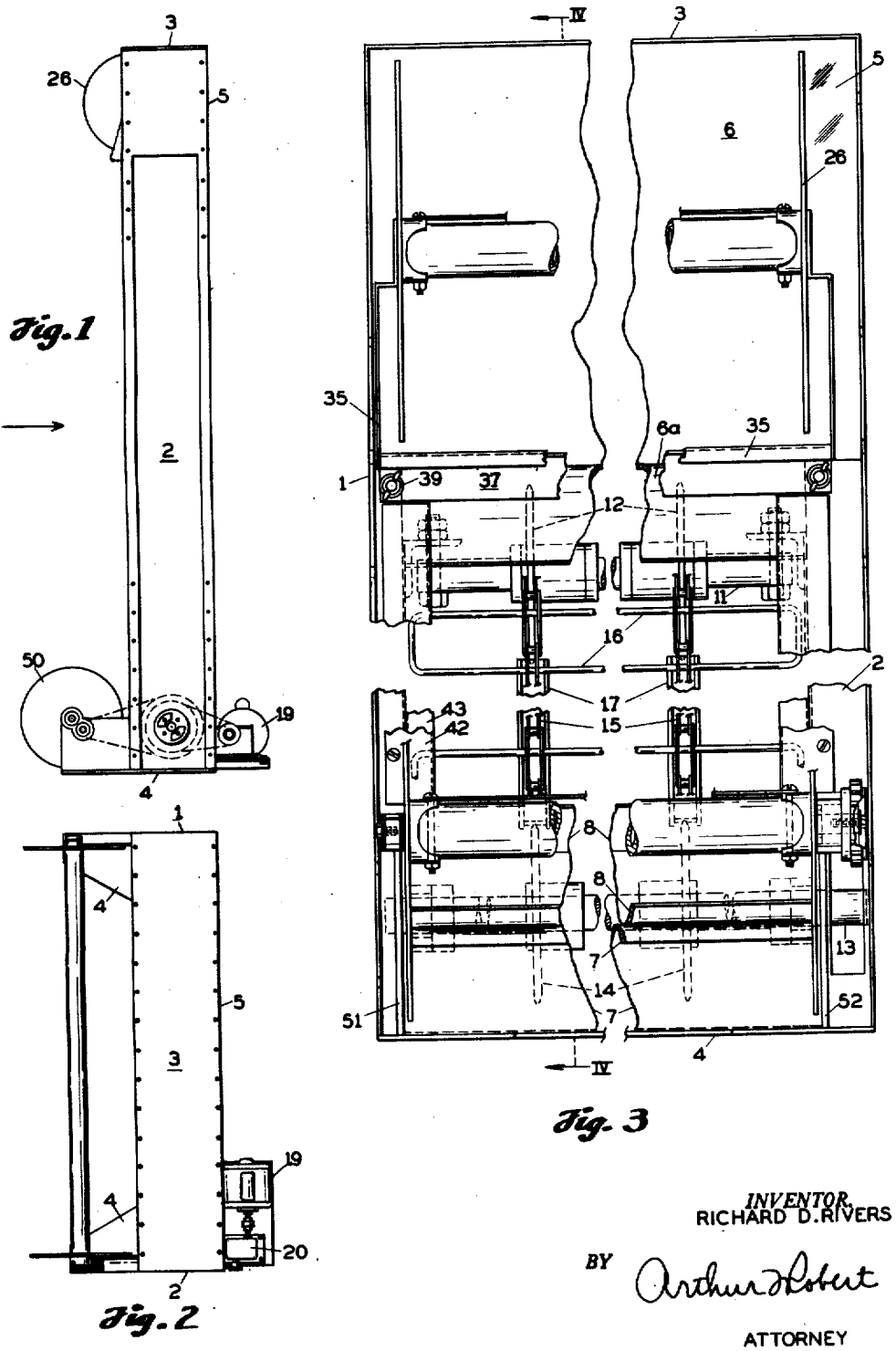

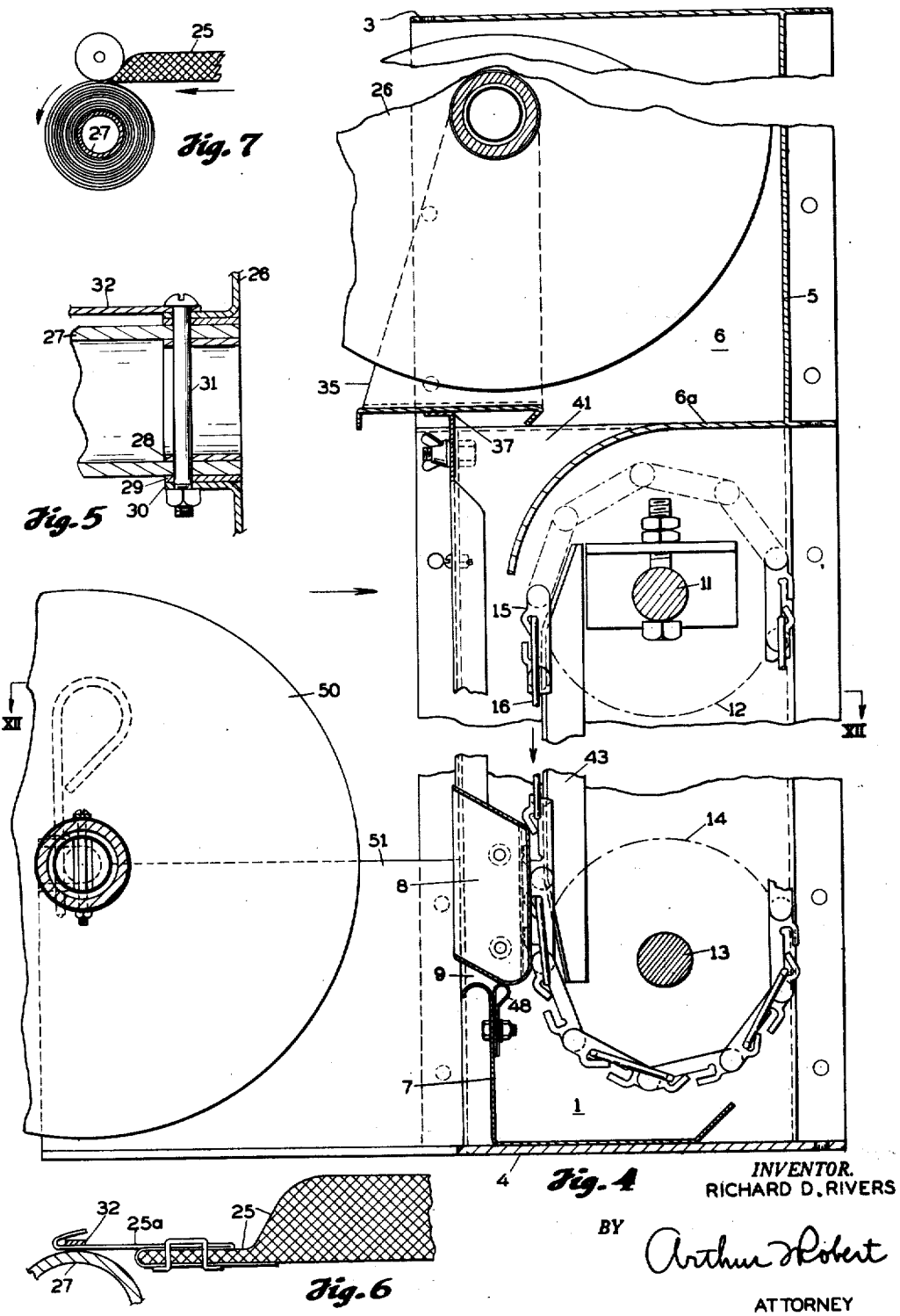

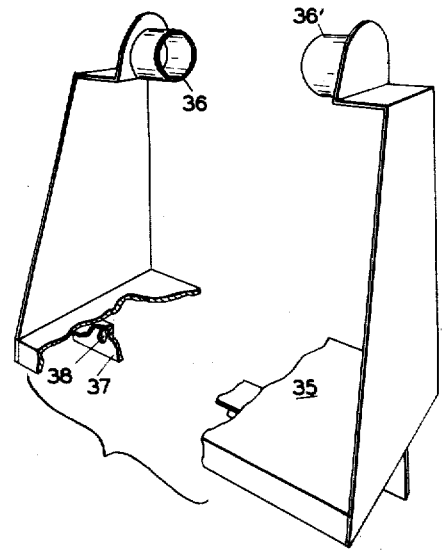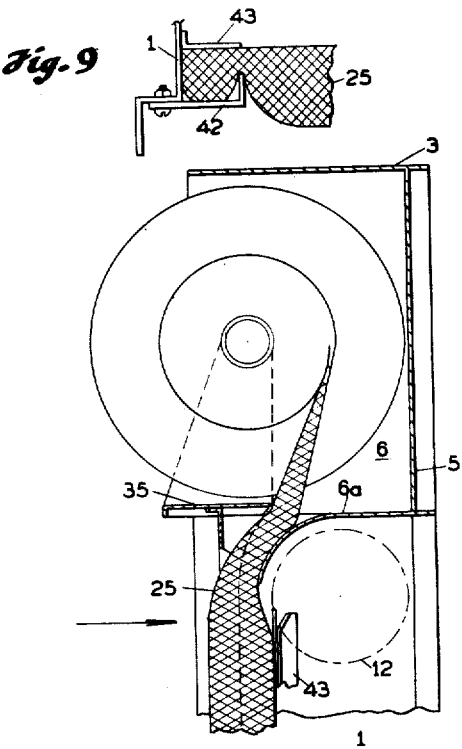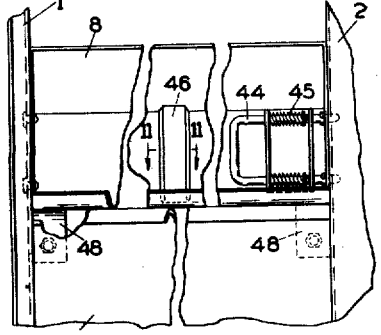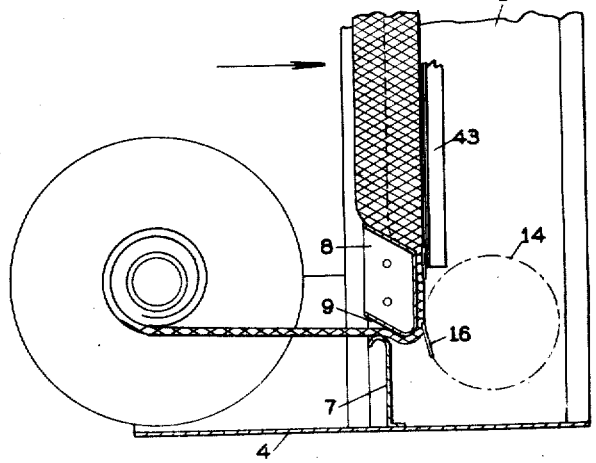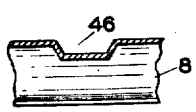

BY *Arthur Robert*

ATTORNEY

2,807,330
Patented Sept. 24, 1957

2,807,330
METHOD AND APPARATUS FOR FILTERING AIR

Richard D. Rivers, Louisville, Ky., assignor to American Air Filter Company, Inc., Louisville, Ky., a corporation of Delaware Application August 4, 1954, Serial No. 447,847

5 Claims. (Cl. 183—62)

This invention relates to automatic ventilating air filters.

Automatic ventilating air filters, as heretofore made, may be classified, in relation to the filter media they employ, as follows:

1. Dry type: (a) permanent air filter medium usually composed of cloth, and (b) disposable air filter medium usually composed of paper; and
2. Viscous impingement type: (a) permanent air filter medium usually composed of metal.

The dry type of automatic air filter has not come into prominent use because of its limited air handling capacity when the filter medium is made to move along a straight path in passing across the air cleaning zone and because of the difficulties encountered in securing a larger air handling capacity by having the filter medium move along a zig zag path in passing across the air cleaning zone. The viscous impingement type of automatic air filter, which has a relatively high air handling capacity, is widely used. Most filters of this type are designed to move the filter medium along an endless path containing an air cleaning zone and a filter cleaning zone, the latter usually being in the form of a bottom oil bath. The viscous type requires maintenance operations involving, among other things, the removal of sludge from the oil bath and the replenishment of that bath. Needless to say, these operations are distasteful and to that extent objectionable.

The principal object of this invention is to provide a novel automatic air filter which combines the advantages of both types while substantially minimizing, if not entirely overcoming, their disadvantages.

Another important object of this invention is to provide a novel automatic air filter of the disposable type which may be used with a filter medium operating either as a dry filter medium or as a viscous impingement filter medium and which avoids the air handling limitations of the disposable dry type and the maintenance objections of the permanent viscous type.

Another important object is to provide an automatic air filter using a disposable type of filter medium having a relatively high air handling capacity and a large dust holding capacity but requiring relatively little maintenance and this only at widely spaced intervals.

I have found that a long, flexible, expansible-compressible air cleaning web, of the highly porous impingement type having an expanded operating air flow depth, may be wound in a compressed condition, wherein it is flattened to a depth smaller than its operating air flow depth, to form a compact supply roll, that compressed web may be pulled from this roll, expanded to its operating air flow depth, and directed across an air cleaning zone in an expanded condition, and that such web may be compressively wound upon leaving the air cleaning zone to form a compact roll of used web which may be readily disposed.

My invention is best illustrated by the structure shown in the accompanying drawings which was designed by another to embody my invention. In these drawings:

Figure 1 is a side elevation of an automatic air cleaner embodying my invention, the drive chains and sprockets being diagrammatically shown for the sake of clarity;

Figure 2 is a top plan view thereof;

Figure 3 is a broken front elevational view thereof;

Figure 4 is a vertical sectional view corresponding to one taken along line IV—IV of Figure 3;

Figure 5 is an axial sectional detail of one end of a spool on which the air cleaning web is mounted in compressed or flattened form, the web being omitted from this view;

Figure 6 is a somewhat diagrammatic view illustrating the manner in which the air filter web is connected to the spool;

Figure 7 is a somewhat diagrammatic view illustrating how the web is wound on the spool in a flattened condition;

Figure 8 is a broken perspective view of the spool holder;

Figure 9 is a detail showing the manner in which the edges of the web are sealed in the air cleaning zone;

Figure 10 is a partly broken front elevational view of the hold-down means;

Figure 11 is a section corresponding to one taken along line 11—11 of the hold-down view of Figure 10;

Figure 17 is a somewhat diagrammatic view showing the contour of the web, in vertical section, during its travel through the air cleaner.

Figure 12:
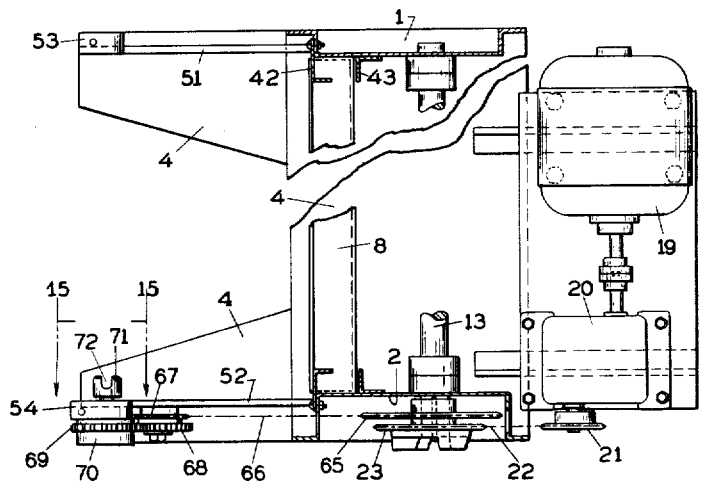
Figure 12 is a horizontal sectional view corresponding to one taken on line XII—XII of Figure 4, this view omitting certain details such as the conveyor sprockets, and the rewind roll but showing the driving end mounting means for the rewind roll.
Figure 14:
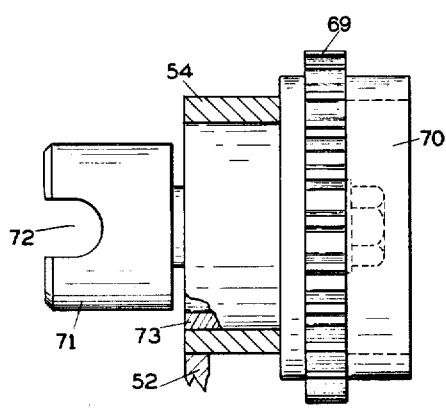
Figure 14 is a detail showing the mounting means at the drive end of the rewind roll.
Figure 15:
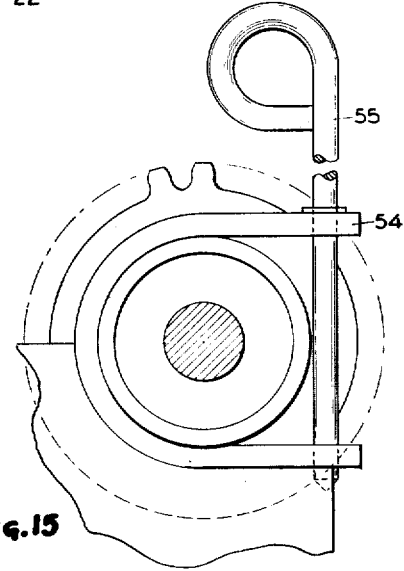
Figure 15 is a view corresponding to one taken along line 15—15 of Figure 12.

The illustrated structure may be outlined as comprising: a frame; a conveyor; conveyor drive means; an air cleaning web; a compressed web supply spool; a spool holder; an expanded web sealing means; discharge zone manipulating means including a hold-down means, discharge web seal, a rewind roll, and means to support and drive the rewind roll; and an operating control system.

Frame, Figs. 1–4

The frame includes a casing having an inlet opening and an outlet opening to accommodate a flow of air therethrough in a direction indicated by the arrow in Figure 1. This casing provides a path for the extension of an air cleaning web from a supply zone through an air cleaning zone, which extends across the air flow, to a discharge zone. It comprises: perimetric walls including vertical side walls 1 and 2 and horizontal top and bottom walls 3 and 4, all cooperating to form an open inlet face at the front of the casing and an open outlet face at its rear, the side walls 1 and 2 being in the form of outwardly open channels with the wall 2 forming a deep channel in relation to the wall 1; a vertical rear wall 5 extending across the upper or top portion of the rear outlet face and cooperating with the side and top walls 1—3 to form a forwardly open supply chamber 6 at the top of the casing, the floor of this chamber including a horizontally-disposed bottom rear wall 6a, the front half of which is forwardly and downwardly curved; and a pair of vertical front walls 7 and 8 extending, in spaced superposed relationship, across the lower portion of the front face of the casing to shield this part of the front face of the casing from the incoming air flow, the front wall 8 being spaced slightly above the wall 7 to form therebetween a horizontal slot 9.

The frame provides a path for the extension of the web from a supply zone, represented by supply chamber 6, downwardly across the front edge of the floor 6a of that chamber to an entrance point at which the web enters the air cleaning zone, then downwardly through the air cleaning zone, which extends across the air flow, to an exit point adjacent the upper end of front wall or plate 8, and thence into a discharge zone which extends first downwardly along the rear face of plate 8 and then forwardly through the slot 9.

Conveyor, Figures 3–4

An endless porous conveyor is mounted in the casing to present an upstream face extending across the air flow path in position to support the filter web against the force of the air flow, this conveyor being operative, when moved, to shift the web within the cleaning zone in a direction such as to pull the chain web from the supply zone while moving used web into the discharge zone.

The conveyor conventionally includes: an upper fixed shaft 11; a pair of rotatable, laterally-spaced sprockets 12 on shaft 11; a lower rotatable shaft 13; a pair of laterally-spaced sprockets 14 fixed to the shaft 13 to rotate therewith; a pair of endless chains 15, each extending around one upper and one lower sprocket; and a suitable openwork structure 16 cooperatively carried by the chains 15. The upstream run of the conveyor is held against inward or rearward movement by vertical chain guides, in the form of channels 17, secured through suitable cross members (not shown) to the side walls 1 and 2 in position to extend at the rear side of the upstream run of the conveyor, one channel 17 along each chain 15.

Conveyor drive means, Figures 1–2 and 12

The conveyor drive means, which operates to drive the lower shaft 13, conventionally includes: a motor 19; gear reducer 20 connected to the motor; gear reducer sprocket 21; and a chain 22 connecting the gear reducer sprocket 21 to a sprocket 23 on that end of the lower shaft 13 which projects through the deep channeled side wall 2. The motor drives shaft 13 to rotate the conveyor in a direction such that its descending run is along the front face of the casing.

Air cleaning web

The present invention contemplates the use of a flexible air cleaning web, of expansible-contractible air flow depth. A flexible compressible air cleaning web having a resiliently expanded operating air flow depth is preferred. While any such web, composed of any suitable material, may be used, I prefer, but do not restrict myself to, an expanded filamentous or fiber glass mat or web of the type shown in U. S. Modigliani Patent 2,546,230 granted March 27, 1951.

Air filter mats of this character are normally made as follows: rotate a drum; reciprocate a furnace back and forth axially along the top of the drum; feed a group of glass filaments from the reciprocating furnace to the rotating drum, until a sufficient number of layers of glass filament have been wound upon the drum to form a condensed mat of desired thickness, and simultaneously spray a thermo-setting adhesive on the filaments during the feeding operation; slit the cylindrical condensed mat axially and remove it from the drum; trim its axial end areas; and stretch it axially to increase its length 30 to 50 times more or less while reducing its width from 60 to 70% more or less. During endwise or axial expansion, the trimmed condensed mat fluffs up to a pronounced degree increasing its thickness from 8 to 16 times more or less and, at the same time, substantially increasing its porosity. The expanded mat is then heated to set the resin and thus form a long air filter web.

Expanded webs of this character can be readily made in lengths ranging up to 100 and 200 feet, in width ranging up to 4 to 6 feet and in depths ranging up to 1 to 3 inches more or less. They can be operated without a viscous coating as a dry filter medium but they are more suited for operation as a viscous impingement filter; hence normally are coated with a dust catching viscous material. While the filament density and size of their openings may be widely varied, it will be understood that the bulk of these openings will normally range from $\frac{1}{16}''$ up to $\frac{1}{2}''$ more or less.

Web spool, Figs. 3–7

In accordance with my invention, a long resiliently expanded air filter web is flattened and manipulated, while flattened, into a compact supply package. Preferably the web is wound on a roll or spool in a compressed condition wherein it is flattened to a depth 8 to 24 times smaller than its operating air flow depth.

I have obtained excellent results with a glass fiber web 25 having a normally expanded depth of 2¾ inches and being compressed to a depth of about ⅛ of an inch as it is wound on a spool 26 to form a supply roll. As best indicated in Figure 5, the spool 26 comprises: a cylindrical core 27 of cardboard or other material; an end assembly at each end of the core including (a) a pair of inner and outer metal rings 28 and 29 sandwiching the end of the core between them, (b) an end plate or disc, also designated 26, having a center boss 30 extending inwardly in telescopic fashion over the adjacent outer metal ring 29, and (c) an assembly securing bolt 31 extending diametrically through the core 27, rings 28, 29 and boss 30; and a spring metal strap 32 extending closely along the core 27 from one bolt 31 to the other and secured to both bolts. The center boss 30 may be used in place of the outer ring 29.

The inner metal ring 28, which appears at the right end of the core, as it appears in Figure 5, has a larger inside diameter than the corresponding ring at the left end and thus provides a right end opening which is larger than the left end opening of the core. The purpose of this is to prevent these ends from being interchangeably mountable on the same support and thus guard against any reversal of the supply spool as will be more fully explained later. Naturally a variety of other means may be used to avoid reversibility.

Each end of the web 25 is compressed between folds of strong manila paper or similar sheet material 25a and stapled to hold it permanently in a compressed condition as indicated in Figure 6. One end of the web is secured to a supply spool 26 by slipping an extension of the paper, which trails from this compressed end, underneath the spring strap 32 and then folding it around that strap. The web is then fed to the spool in its normal expanded form, so that it is under little or no tension, flattened against the core of the spool by a stationary hold-down bar or non-rotating roll and wound thereon in a flattened condition as indicated in Figure 7.

Spool holder, Fig. 8

To support the web in the supply chamber 6, a spool holder 35 in the form of a U-shaped bracket is provided. The arms of this bracket are somewhat resilient. The outer ends of the arms are bent inwardly and then terminate in outwardly extending tips and each tip is provided with a boss 36. These bosses are designed to support the supply spool 26 by projecting into the open ends of its core; hence one boss 36' is made larger in outside diameter than the other so that it will fit snugly into the larger end of the spool and cannot be made to enter the smaller open end thereof. Each bracket 35 carries, on its underside, an angle 37 having a pair of holes 38, one positioned adjacent each end of the bracket to receive a casing stud bolt for mounting the bracket on the casing.

The spool holder 35 preferably is removed from the casing for loading purposes. When loaded with a supply spool, it is firmly anchored to the casing stud bolts by wing nuts 39. The large core end of the spool and the large boss 36' of the holder insure the positioning of the spool in supply chamber 6 so that it will feed from its rear side.

The bight of the spool holder 35 is horizontally spaced forwardly from the downwardly curved floor plate 6a of the supply chamber 6 to form a slot 41 through which the web 25 is fed from the supply zone into the air cleaning zone.

Web sealing means, Fig. 9

A seal is provided, along each vertical edge of the web in the air cleaning zone, by vertically arranged front and rear strips 42 and 43 secured to the adjacent side wall of the housing. The front strip is flanged rearwardly so as to pinch or compress the expanded web. Furthermore, a web slightly wider than the distance from one side wall of one sealing passage to the opposite side wall of the other sealing passage, is preferred because it tends to compress the web material in the sealing passage and thus insures a very effective seal.

Discharge zone manipulating means

As the web progressively crosses the air cleaning zone it will progressively accumulate its load of dust. When it reaches the discharge zone, it may be further handled in any of a variety of ways. For example, it may be fed, fully expanded, into any suitable system and there reconditioned for reuse, treated to recover any values in the collected dust or accumulated either in expanded form or in the form of debris to which it may be reduced by chopping, grinding, burning, etc.

In further accordance with my invention, however, the web in the discharge zone preferably is flattened and manipulated, in flattened condition, to form a compact package which can be ultimately removed and discarded, reconditioned or otherwise treated. I prefer the use of a rewinding roll in the discharge zone since this is one of the easier ways to manipulate the web into a compact package. The preferred way is to pull the web so as to place it under tension and to wind the web under tension. The preferred manipulating means therefore involves the use of: a hold-down means; discharge web seal; a rewind roll spaced from the hold-down means; and means for mounting and driving the rewind roll.

Hold-down means

The hold-down means functions not only to hold the web against the pull of the rewind means but also, at the same time, to prevent the pulling force from being transmitted to the expanded web in the air cleaning zone. It will be noted that the front plate 8 is in the form of a trough open at the front, closed at both ends and arranged wih its rear wall or bottom positioned closely adjacent the conveyor. This plate or trough 8 flattens the web against the conveyor, or cooperates with the conveyor to pinch the web, with a hold-down force or pressure sufficient to prevent any pull, on the web leaving the hold-down, from being transmitted to the expanded web approaching the hold-down.

The hold-down plate 8 should be readily removable to facilitate web removal and replacement. Accordingly, as shown in Figs. 4, 10 and 17, the hold-down plate has dimples at one of its closed ends to receive frame pins and, adjacent its opposite end, it is provided with a latch 44 which is yieldably urged by springs 45 into suitable latching openings formed in the frame. Furthermore, since the conveyor chains 15 project outwardly beyond the upstream face of the conveyor formed by the openwork member 16, the hold-down plate 8 has a pair of channels 46 to accommodate the chains.

Discharge web seal, Figs. 10 and 4

When the web in the discharge zone is placed under tension, it is attenuated, losing width and thickness while gaining in length. Consequently, to seal off any openings, which may be formed at opposite ends of the slot 9 between plates 7 and 8, the plate 7 is provided, at each end, with an appropriate seal 48 (see Fig. 10) formed by a flexible strip which is looped as shown in Fig. 4.

Rewind spool

To pull and tension the web leaving the hold-down, the web is connected to a rewind spool 50 and means is provided to drive the rewind spool at a speed sufficient to maintain the flattened web under a desired degree of tension. The rewind spool 50 preferably is identical to the supply spool 26; hence when a supply spool is exhausted, it may be used as the next rewind spool.

Means supporting and driving rewind spool, Figs. 12–15

The rewind spool is rotatably mounted on the side walls 51 and 52 of a frame, which is formed by extending the bottom wall 4 forwardly and connecting the forwardly extending vertical side walls 51 and 52 both to the bottom extension 4 and to the casing side walls.

The front uppermost corners of each of these side walls 51 and 52 has a forwardly open U-shaped strap welded to it, the smaller strap 53 being welded to wall 51 and the larger strap 54 to wall 52. The open end of each strap may be closed by a readily insertable and removable pin 55. The rewind spool is rotatably supported by having its large and small ends connected to the large and small U-shaped straps 53 and 54 respectively.

Figure 13:
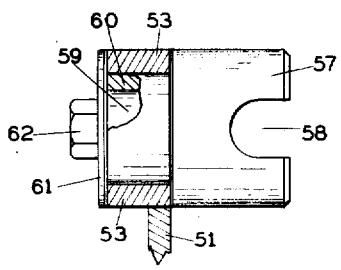
Figure 13 is a detail showing the mounting connection for the undriven end of the rewind roll.

The smaller end connection shown in Figure 13 includes a trunnion 57 having: a cylindrical end portion, also designated 57, designed to fit within the smaller end of the core; and a slot 58 diametrically at its free end to engage the end assembly securing bolt 31 of the core of the rewind spool. The opposite end of the trunnion terminates in a smaller shaft 59 which is surrounded by an oil-impregnated or "oilite" bearing 60 dimensioned to fit within the smaller strap 53 and be retained therein by the securing pin 55. If desired, a washer 61 and bolt 62 may be secured to the shaft 59 to prevent this trunnion from being removed axially from its strap 53.

The connection for rotatably supporting the opposite end of the rewind spool forms a part of the driving connection for the rewind spool. As will be appreciated from Figures 12, 14–15, the rewind spool is driven from lower shaft 13 through sprocket 65, chain 66, sprocket 67, gear 68, and gear 69, on the driving end 70 of a constant torque unit or slip friction clutch, the driven end 71 of which is dimensioned to project into and fit snugly within the large end of the rewind spool core. This driven end of the constant torque unit is also slotted at 72 for driving engagement with the end assembly bolt 31 of the core.

The torque unit, which carries an oilite bearing 73, is of the conventional type having a series of friction plates under an adjustable axially-directed clamping pressure with the alternate friction plates connected to the driving member 70 and the remaining friction plates connected to the driven member 71. With this or any equivalent constant torque unit, the driving member 70 can be rotated at a relatively fast speed and it will rotate the driven member 71 at whatever lower speeds correspond to a given torque.

Figure 16:
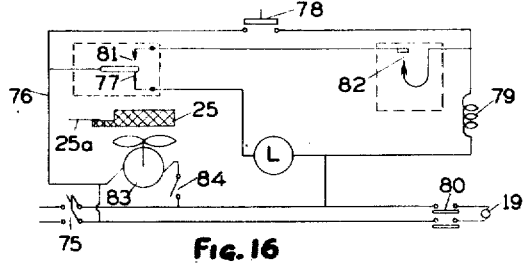
Figure 16 is a diagrammatic view of the control system.

Operating control system, Figure 16

The operating control system of Figure 16 has a main line switch 75 for supplying power to circuits, which extend from one side of power to the other, as follows: a light circuit extending through lead line 76, switch 77 and a warning signal or lamp L; a manually-closable circuit for manually controlling the operation of the drive motor 19, this circuit extending serially through lead line 76, normally-open manually-operable switch 78 and solenoid 79, which operates to close line circuit contacts 80; a web shifting circuit for automatically shifting the web at desired intervals, this circuit extending serially through line 76, switch 81, switch 82 and solenoid 79; a fan circuit extending serially through fan 83 and switch 84; and the driving motor circuit extending through motor 19 and solenoid contacts 80.

In conditioning the filter for operation, a supply spool, containing a supply of clean web 25 compressively wound thereon, is placed on the spool holder 26 and the latter mounted in the supply chamber 6. This web is manually pulled from the spool downwardly through the air cleaning zone into the discharge zone. The hold-down plate 8 is removed to facilitate this operation and the web connected to the rewind spool 50. The hold-down plate 8 is replaced and, with the main switch 75 closed, the manual circuit may be closed temporarily through switch 78 to operate the rewind roll and conveyor long enough to make certain that the web will properly wind upon the rewind roll.

With the closure of the supply switch 75, the lamp L will be illuminated indicating that al lair is closed off. Upon the closure of fan motor switch 84, the fan 83 will begin to operate blowing or drawing air through the expanded web 25. The resulting air flow opens the switch 77 and closes switch 81. Under normal operating conditions, none of the circuits, other than the fan circuit, will be energized.

However, as the expanded web accumulates dirt, its air flow resistance will rise. When this resistance equals a predetermined high value, the air flow resistance switch 82 will close to energize the solenoid 79 in the control circuit and thereby close contacts 80 energizing the circuit of drive motor 19. This motor will now operate to shift the web in the air cleaning zone in a direction such as to pull clean web from the supply spool and move used web into the discharge zone and to rewind used web on the rewind spool. The movement of clean web into the air cleaning zone reduces the air flow resistance in that zone. Ultimately this reduction is sufficient to cause the air flow resistance switch 82 to open and thus stop any further movement of the web. This type of operation continues until the supply spool is exhausted.

When the supply spool is exhausted, the tail paper 25a (Fig. 16) will ultimately move into the upper portion of the air cleaning zone, reaching a position where it shields switches 77 and 81 from the air flow. This results in the opening of control circuit switch 81 and the closure of light circuit switch 77. Now the fan motor 83 may be shut off, manual switch 78 closed to move the rest of the web into the discharge zone and complete the winding of that web upon the spool 50. That spool is then removed, the empty supply spool transferred to take the place of the rewind spool, a new supply spool mounted in place of the empty one, the web again threaded through the machine and normal operation once again permitted to take place.

Scope of invention

My invention resides broadly in the method and apparatus for accomplishing any one or more of the following steps: providing a supply roll of compressed air cleaning web in a supply zone; feeding web from that roll and causing it to expand; directing expanded web through an air cleaning zone extending across the air flow; sealing the edges of the expanded web; directing used web from the air cleaning zone into a discharge zone; and manipulating the used web in the discharge zone into a compact package. My invention broadly includes any means for compressing the web into a compact roll and specifically includes a stationary hold-down pressing or flattening a new or used web against a roll on which it is being wound.

The use of the word "air" herein and in the appended claims includes other gaseous fluids.

Having described my invention, I claim:

1. A supply of filter medium for air filtering operations consisting of a pre-formed package comprising a mandrel member having convolutely wound thereon a relatively elongate permeable expansible-compressible web which will return to an expanded state when released from a compressed state, the layers of which are compressed to a depth which is less than one-half the depth of the web in its uncompressed condition.

2. In a method of filtering from an air stream solids borne thereby, the steps consisting of progressively removing and expanding from a compressed supply web thereof and expansible-compressible filter medium, moving the medium into and through said air stream and thereafter progressively recompressing the thus exposed medium, carrying the solids retained in it, into a disposable package.

3. In a method of filtering from an air stream foreign matter borne thereby, the steps consisting of progressively removing and expanding an expansible-compressible filter medium from a compressed supply web thereof, displacing said expanded medium progressively through said air stream and thereafter progressively conditioning the thus exposed medium, and the foreign matter retained in it, to a disposable state.

4. In combination in an air filtering apparatus adapted to employ as a filter medium an elongate permeable expansible-compressible integral web which will return to an expanded state when released from a compressed state and arranged to define an air filtering area and a passage for air through said area, means adjacent said area defining a supply zone for the location of a supply of precompressed filter medium, means defining a discharge zone located to receive said filter medium at a point beyond said area, said last two mentioned means defining with said area a path of filter medium advance, means for progressively displacing precompressed filter medium located in said supply zone from said compressed state and through said filtering area and into said discharge zone and means located in said discharge zone for progressively conditioning the filter medium advanced thereinto to a disposable state.

5. The apparatus set forth in claim 4 wherein the means for progressively conditioning the filter medium advanced into the discharge zone includes means for recompressing the filter medium.

References Cited in the file of this patent

UNITED STATES PATENTS

| | | |
|---|---|---|
| 746,257 | Baggaley | Dec. 8, 1903 |
| 1,638,067 | Szekely | Aug. 9, 1927 |
| 1,783,181 | Birkholz | Dec. 2, 1930 |
| 1,812,736 | Butler | June 30, 1931 |
| 1,822,471 | Borden | Sept. 8, 1931 |
| 1,933,635 | Meyer | Nov. 7, 1933 |
| 1,982,639 | Christofferson | Dec. 4, 1934 |
| 2,016,991 | Dollinger | Oct. 8, 1935 |
| 2,119,978 | Wolthuis et al. | June 7, 1938 |
| 2,133,931 | Walker et al. | Oct. 18, 1938 |
| 2,218,453 | Mickle | Oct. 15, 1940 |
| 2,546,230 | Modigliani | Mar. 27, 1951 |

UNITED STATES PATENT OFFICE
CERTIFICATE OF CORRECTION

Patent No. 2,807,330                                              September 24, 1957

Richard D. Rivers

It is hereby certified that error appears in the printed specification of the above numbered patent requiring correction and that the said Letters Patent should read as corrected below.

Column 3, line 20, for "chain" read -- clean --; column 4, line 37, strike out ", as it appears"; column 7, line 19, for "al lair" read -- all air --; column 8, line 17, for "and" read -- an --.

Signed and sealed this 7th day of January 1958.

(SEAL)

Attest:

KARL H. AXLINE
Attesting Officer

ROBERT C. WATSON
Commissioner of Patents